(12) United States Patent
Van Rompaey

(10) Patent No.: US 10,144,631 B2
(45) Date of Patent: Dec. 4, 2018

(54) TAP FOR DISPENSING A BEVERAGE

(71) Applicant: Anheuser-Busch InBev S.A., Brussels (BE)

(72) Inventor: Johan Van Rompaey, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 15/504,599

(22) PCT Filed: Aug. 4, 2015

(86) PCT No.: PCT/EP2015/067975
§ 371 (c)(1),
(2) Date: Feb. 16, 2017

(87) PCT Pub. No.: WO2016/026694
PCT Pub. Date: Feb. 25, 2016

(65) Prior Publication Data
US 2017/0233239 A1    Aug. 17, 2017

(30) Foreign Application Priority Data
Aug. 19, 2014  (EP) ..................................... 14181359

(51) Int. Cl.
*B67D 1/14* (2006.01)
*B67D 1/00* (2006.01)
*F16K 31/53* (2006.01)

(52) U.S. Cl.
CPC ......... *B67D 1/1477* (2013.01); *B67D 1/0082* (2013.01); *F16K 31/535* (2013.01)

(58) Field of Classification Search
CPC .... B67D 1/1477; B67D 1/0082; F16K 31/535
See application file for complete search history.

(56) References Cited

U.S. PATENT DOCUMENTS

| | | | |
|---|---|---|---|
| 1,561,271 A | 11/1925 | Morlok | |
| 2,169,393 A | 8/1939 | Rice | |
| 2,331,527 A | 10/1943 | Welty et al. | |
| 2,482,873 A * | 9/1949 | Roberts | F16K 5/0207 137/614.11 |
| 3,052,381 A | 9/1962 | Carpigiani | |
| 6,460,735 B1 * | 10/2002 | Greenwald | A47J 31/467 222/145.5 |
| 6,502,725 B1 * | 1/2003 | Alexander | B67D 1/0456 222/105 |
| 8,082,947 B2 * | 12/2011 | Chang | F16K 5/0647 137/614.01 |

(Continued)

FOREIGN PATENT DOCUMENTS

| | | |
|---|---|---|
| DE | 102010044549 | 3/2012 |
| WO | WO 2004/009487 | 1/2004 |

*Primary Examiner* — Frederick C Nicolas
(74) *Attorney, Agent, or Firm* — Levy & Grandinetti

(57) ABSTRACT

A tap for dispensing a beverage has a housing defining a channel for dispensing and a dispensing valve arranged in the housing. The valve is operable by a handle and connected via a tap drive shaft and a gear transmission to a valve drive shaft. The gear transmission has at least two cooperating gear wheels. The gear transmission could have a variable gear ratio. A method for manufacturing a tap for dispensing a beverage is disclosed.

12 Claims, 7 Drawing Sheets

(56) References Cited

U.S. PATENT DOCUMENTS

| | | | | |
|---|---|---|---|---|
| 8,342,364 B2 * | 1/2013 | Bertucci | ............ | G05D 11/006 |
| | | | | 137/99 |
| 8,887,762 B2 * | 11/2014 | Densel | ............ | F16L 37/36 |
| | | | | 137/614.06 |
| 9,033,192 B2 * | 5/2015 | Hapke | ............ | H02K 26/00 |
| | | | | 222/504 |
| 2007/0151992 A1 * | 7/2007 | Carlson | ............ | B67D 1/0006 |
| | | | | 222/509 |
| 2010/0140522 A1 | 6/2010 | Chang et al. | | |

* cited by examiner

TAP FOR DISPENSING A BEVERAGE

FIELD OF THE INVENTION

The present invention relates to a tap for dispensing a beverage, comprising a housing defining a channel for dispensing a beverage, a valve arranged in the housing allowing opening and closing the dispensing channel, said valve operable by a handle, and a gear transmission between the handle and the valve.

BACKGROUND

Drinks supplied in kegs, e.g. beer and soft drinks, are served with the aid of external pressure from a cylinder of carbon dioxide (or occasionally nitrogen) which forces the beer out of the keg via a narrow tube towards the tap. At the tap, the tube is connected to a dispensing channel opened and closed by means of a valve actuated by a handle acting as a lever on the valve and controlling the flow dispense into the glass.

Since each type of drink, in particular each type of beer, requires a specific tapping regime for obtaining a tasteful and culturally accepted result in the glass, taps are usually tuned with respect to external pressure used, type of valve, opening of the valve and diameter of the dispensing channel, resulting flow rate, design of the spout, etc.

In an attempt to provide tap designs enabling dispense of different drinks each with a suitable tapping regime, taps were proposed having the possibility to variably changing the tapping regimes depending on the drink. For example U.S. Pat. No. 1,561,271 describes a tap allowing two different pressures by providing a valve with two openings of different diameter and a gear between handle and valve enabling selection of the most suitable opening.

Another important aspect of a tap regime is the dispense speed. At events or bars with very high consumption of draught beverages, bartenders tend to dispense at as high speed as possible with as less as manual effort as possible, while at other occasions where slow tapping and accurate pouring of the glass is important, bartenders tend to present their skills in accurate manual control of the pouring of the glass. In the first case, the valve should be fully opened and closed at very high actuation rate upon limited motion of the handle, while in the second case the tap should enable accurate motion of the valve in reaction to a movement of the handle. Obviously, both tap regimes require different tap designs.

However, a main problem of a conventional tap is that the design cannot be changed anymore once installed. For example, changing the valve design or changing the transmission design between the handle and valve is practically impossible. As a result, different types of taps have to be developed, distributed and maintained for different types of drinks, events and occasions.

An additional problem is that if one should consider changing the valve, contamination of the dispensing channel and even infection of the drink becomes a risk.

It is therefore an object of the present invention to provide a tap enabling flexibility in using different tap regimes, both for high speed beverage dispensing and for slow accurate beverage dispensing.

Moreover, the present invention enables modifying the tap as a function of its intended use without compromising the tap quality and the valve integrity, and without contaminating the dispensing channel.

In addition, since the present invention enables modifying a tap regime after the tap is assembled, one tap assembly may be suitable for manufacture of taps with different tapping regimes, consequently resulting in improved tap production flexibility and less warehouse stock needed.

Another object of the present invention is to provide a tap enabling not only a skilled technician, but also the bartender to modify the tap as a function of its intended use.

SUMMARY OF THE INVENTION

In a first aspect, the present invention is directed to a tap for dispensing a beverage, comprising:
(a) a housing defining a channel for dispensing a beverage,
(b) a valve arranged in the housing allowing opening and closing the dispensing channel, said valve operable by a handle and connected to a valve drive shaft and said handle connected or to be connected to a tap drive shaft, and
(c) a gear transmission,
characterized in that the gear transmission comprises at least two cooperating gear wheels, a first gear wheel coupled to the tap drive shaft and a second gear wheel coupled to the valve drive shaft, at least one of said gear wheels being removable from its shaft.

In a preferred embodiment, a tap for dispensing a beverage is provided, wherein the gear transmission comprises a planetary gear system having a sun gear, one or more planet gears and an annular gear, and wherein at least two of said sun gear, one or more planet gears and annular gear are respectively coupled to the valve drive shaft and the tap drive shaft, or vice versa, and a least one mounted removable from its shaft. The planetary gear system may preferably be mounted at an exterior side of the tap for easy modification of the gear ratio by the manufacturer or the user.

Further, the present invention is directed to a kit of parts comprising:
(a) a housing defining a channel for dispensing a beverage,
(b) a valve arranged in the housing allowing opening and closing the dispensing channel, said valve operable by a handle and connected to a valve drive shaft and said handle connected or to be connected to a tap drive shaft, and
(c) a gear transmission comprising at least two cooperating gear wheels, a first gear wheel to be removably coupled to the tap drive shaft and a second gear wheel to be removably coupled to the valve drive shaft.

In addition, the present invention is also directed to a method for manufacturing a tap for dispensing a beverage allowing control between the tap handle rotation angle and the valve actuation rate, said tap comprising: (a) a housing defining a channel for dispensing a beverage, (b) a valve arranged in the housing allowing opening and closing the dispensing channel, said valve operable by a handle and connected to a valve drive shaft and said handle connected to a tap drive shaft, and (c) a gear transmission comprising at least two cooperating gear wheels, a first gear wheel to be removably coupled to the tap drive shaft and a second gear wheel to be removably coupled to the valve drive shaft; the method comprising the steps of
  assembling the housing, with the valve coupled to the valve drive shaft arranged therein;
  mounting the tap handle on the tap drive shaft;
  selecting a set of gears in view of the desired gear ratio between the valve drive shaft and the tap drive shaft; and subsequently to assembling the valve and the handle, removably mounting the gears on their respective drive shafts, such that the gear wheels interact.

In a second aspect of the present invention, a tap for dispensing a beverage is provided, comprising:
(a) a housing defining a channel for dispensing a beverage,
(b) a valve arranged in the housing allowing opening and closing the dispensing channel, said valve operable by a handle, and
(c) a gear transmission between the valve and the handle, characterized in that the gear transmission has a variable gear ratio.

In another preferred embodiment, a tap for dispensing a beverage is provided wherein the gear transmission comprises two gear systems with different gear ratio and a means for coupling the handle to one or the other gear system. Accordingly, one or more gears of one or both of the gear systems may be removably mounted, preferably at an exterior side of the tap for easy modification of the difference in gear ratio between the two gear systems.

In a particular embodiment, the variable gear transmission may comprise two planetary gear systems with different gear ratio, each mounted at opposite sides of valve around the valve's axis of rotation, preferably offset from the valve.

SHORT DESCRIPTION OF THE DRAWINGS

Figure 5:
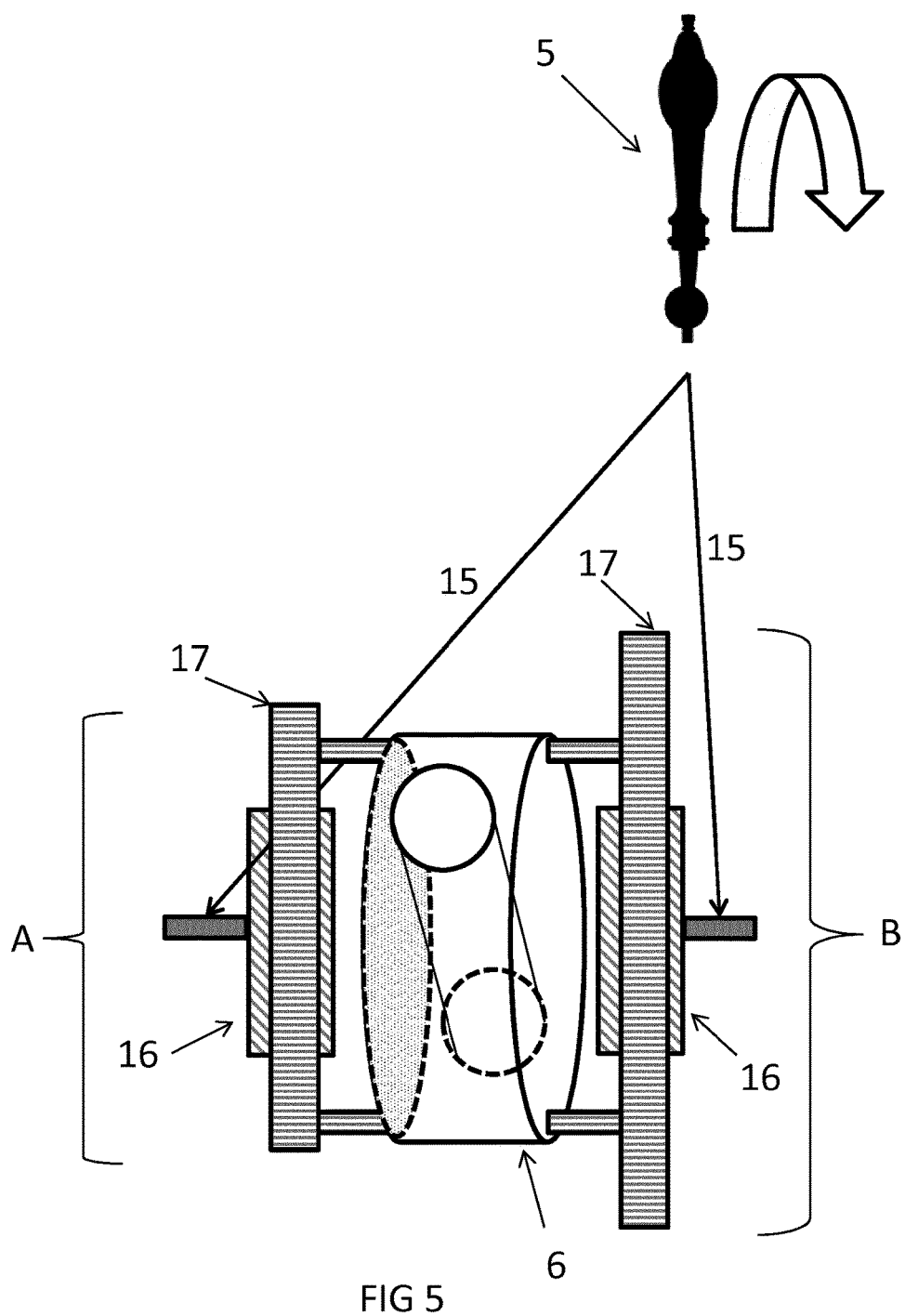

FIG. 5, 6, 7 each illustrate an embodiment of a tap in accordance with the present invention having a gear transmission with variable gear ratio comprising two planetary gear systems.

DETAILED DESCRIPTION

In a first aspect, the present invention is directed to a tap for dispensing a beverage, comprising:
(a) a housing defining a channel for dispensing a beverage,
(b) a valve arranged in the housing allowing opening and closing the dispensing channel, said valve operable by a handle and connected to a valve drive shaft and said handle connected or to be connected to a tap drive shaft, and
(c) a gear transmission,
characterized in that the gear transmission comprises at least two cooperating gear wheels, a first gear wheel coupled to the tap drive shaft and a second gear wheel coupled to the valve drive shaft, at least one of said gear wheels being removable from its shaft.

In the context of the present invention, the gear ratio of the transmission defines the ratio between the gear driven by the handle and the gear driving the valve, which in general boils down to the ratio between the rotation angle of the handle and the rotation angle of the valve. In other words, the gear ratio of the transmission determines the valve actuation rate upon rotating the handle. Therefore by making at least one of the gears removable from its shaft, this gear can be replaced by another one with different diameter thereby modifying the gear ratio of the gear transmission and consequently the valve actuation rate upon rotating the handle.

A tap according to the present invention enables flexibility in use, not only in the actual dispensing speed and control when pouring a glass, but also in tuning the tap as a function of dispensing frequency. Such tap may be tuned for a range of tapping regimes from very high speed beverage dispensing to slow accurate beverage dispensing. In the first case the valve may be fully opened and closed at very high actuation rate by an angular rotation of the handle which is smaller, and preferably significantly smaller than the angular rotation of the valve. In the latter case the valve may be fully opened and closed by an angular rotation of the handle which is the same or greater than the angular rotation of the valve such that the valve may be accurately and controllably opened with desired actuation rate, closed with desired actuation rate, fully or partially, by accurate control of the angular rotation of the handle.

The removably mounted gear(s) or the gear transmission in general may preferably be mounted at an exterior side of the tap for easy modification of the gear ratio by the manufacturer or the user.

Figure 1:
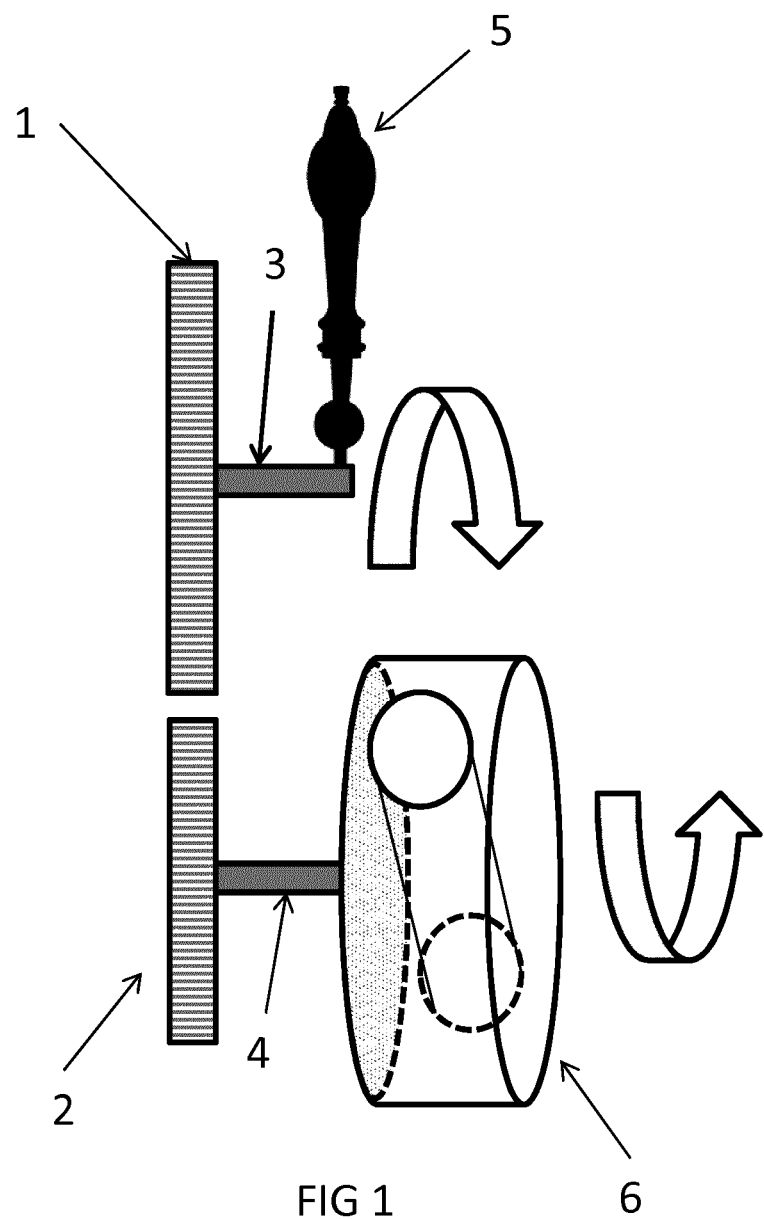
FIG. 1 illustrates a basic embodiment of a tap in accordance with the present invention.

In a particular embodiment in accordance with the present invention as illustrated in FIG. 1, the valve drive shaft (4) may extend in a longitudinal direction offset from the valve (6) ending in an end portion and wherein the first gear wheel (2) is coupled to said end portion of the valve drive shaft. Preferably, also the tap drive shaft (3) may extend in the same longitudinal direction of the valve drive shaft ending in an end portion and the second gear wheel (1) may be coupled to the end portion of the tap drive shaft.

In another preferred embodiment, a tap for dispensing a beverage is provided, wherein the gear transmission comprises a planetary gear system having a sun gear, one or more planet gears and an annular gear, and wherein at least two of said sun gear, one or more planet gears and annular gear are respectively coupled to the valve drive shaft and the tap drive shaft and at least one mounted removably from its respective shaft.

Such planetary gear system may be mounted at an exterior side of the tap, preferably mounted around the valve's axis of rotation which may be advantageous from design point of view because of efficient use of available space in the tap. The valve drive shaft and the tap drive shaft may be coupled to the sun gear, or to the one or more planet gears (optionally via a planet carrier), or to the annular gear, in any possible combination.

Using planetary systems may have an additional advantage in the sense that it may be relatively easy to change the gear ratio of one or both of the planetary gear systems by changing for example a sun gear and corresponding planet gears.

Obviously, a person skilled in the art will understood that in a variety of gear transmission types (but not in all), if one gear wheel is released and replaced by another one with different diameter, normally (but not always) at least another gear needs to be removed and replaced by a different one with different diameter in order to obtain a properly functioning gear mechanism.

Alternatively, a tap may be provided wherein the gear transmission comprises a first gear wheel removably mounted on the tap drive shaft, a second gear wheel coupled to the valve drive shaft, and a means shifting the first gear wheel to a position engaging directly or indirectly with the second gear wheel. In most gear transmission types, if one gear wheel is released and replaced by another one with different diameter, normally at least another gear needs to be removed and replaced by a different one with different diameter in order to obtain a properly functioning gear mechanism. However if a means is provided for shifting the first gear wheel depending on its diameter such that it properly engages with the second gear wheel, the second gear wheel does not need to be replaced and consequently does not need to be mounted removably.

Further, the present invention is directed to a kit of parts comprising:
(a) a housing defining a channel for dispensing a beverage,
(b) a valve arranged in the housing allowing opening and closing the dispensing channel, said valve operable by a handle and connected to a valve drive shaft and said handle connected or to be connected to a tap drive shaft, and
(c) a gear transmission comprising at least two cooperating gear wheels, a first gear wheel to be removably coupled to the tap drive shaft and a second gear wheel to be removably coupled to the valve drive shaft.

In an embodiment of a kit of parts according to the present invention, the tap drive shaft may extend in a longitudinal direction offset from the valve ending in an end portion on which the first gear wheel is removably coupled, and the tap drive shaft may extend in the same longitudinal direction of the valve drive shaft ending in an end portion on which the second gear wheel is removably coupled.

In another embodiment the kit of parts may comprise a planetary gear system for being removably coupled to the valve drive shaft and the tap drive shaft, or a plurality of planetary gear systems in case of a gear transmission with variable gear ratio.

Additionally, the present invention is also directed to a method for manufacturing a tap for dispensing a beverage, said tap comprising: (a) a housing defining a channel for dispensing a beverage, (b) a valve arranged in the housing allowing opening and closing the dispensing channel, said valve operable by a handle and connected to a valve drive shaft and said handle connected to a tap drive shaft, and (c) a gear transmission comprising at least two cooperating gear wheels, a first gear wheel to be removably coupled to the tap drive shaft and a second gear wheel to be removably coupled to the valve drive shaft; the method comprising the steps of
 assembling the housing, with the valve coupled to the valve drive shaft arranged therein;
 mounting the tap handle on the tap drive shaft;
 selecting a set of gears in view of the desired gear ratio between the valve drive shaft and the tap drive shaft; and
 subsequently to assembling the valve and the handle, removably mounting the gears on their respective drive shafts, such that the gear wheels interact.

By removably mounting the gears, subsequently to assembling the valve and the handle, the present invention enables modifying the tap as a function of its intended use without compromising the tap quality and the valve integrity, and without contaminating the dispensing channel.

In addition, it enables modifying a tap regime after the tap is assembled, such that one tap assembly may be suitable for manufacture of taps with different tapping regimes, consequently resulting in improved tap production flexibility and less warehouse stock needed.

In a second aspect of the present invention, a tap for dispensing a beverage is provided, comprising:
(a) a housing defining a channel for dispensing a beverage,
(b) a valve arranged in the housing allowing opening and closing the dispensing channel, said valve operable by a handle, and
(c) a gear transmission between the valve and the handle, characterized in that the gear transmission has a variable gear ratio.

By making the gear ratio variable, a tap according to the present invention enables flexibility in use, not only in the actual dispensing speed and control when pouring a glass, but also in tuning the tap as function of dispensing frequency. In extreme cases the same tap can be tuned both for very high speed beverage dispensing and for slow accurate beverage dispensing by varying the gear ratio.

Figure 2:
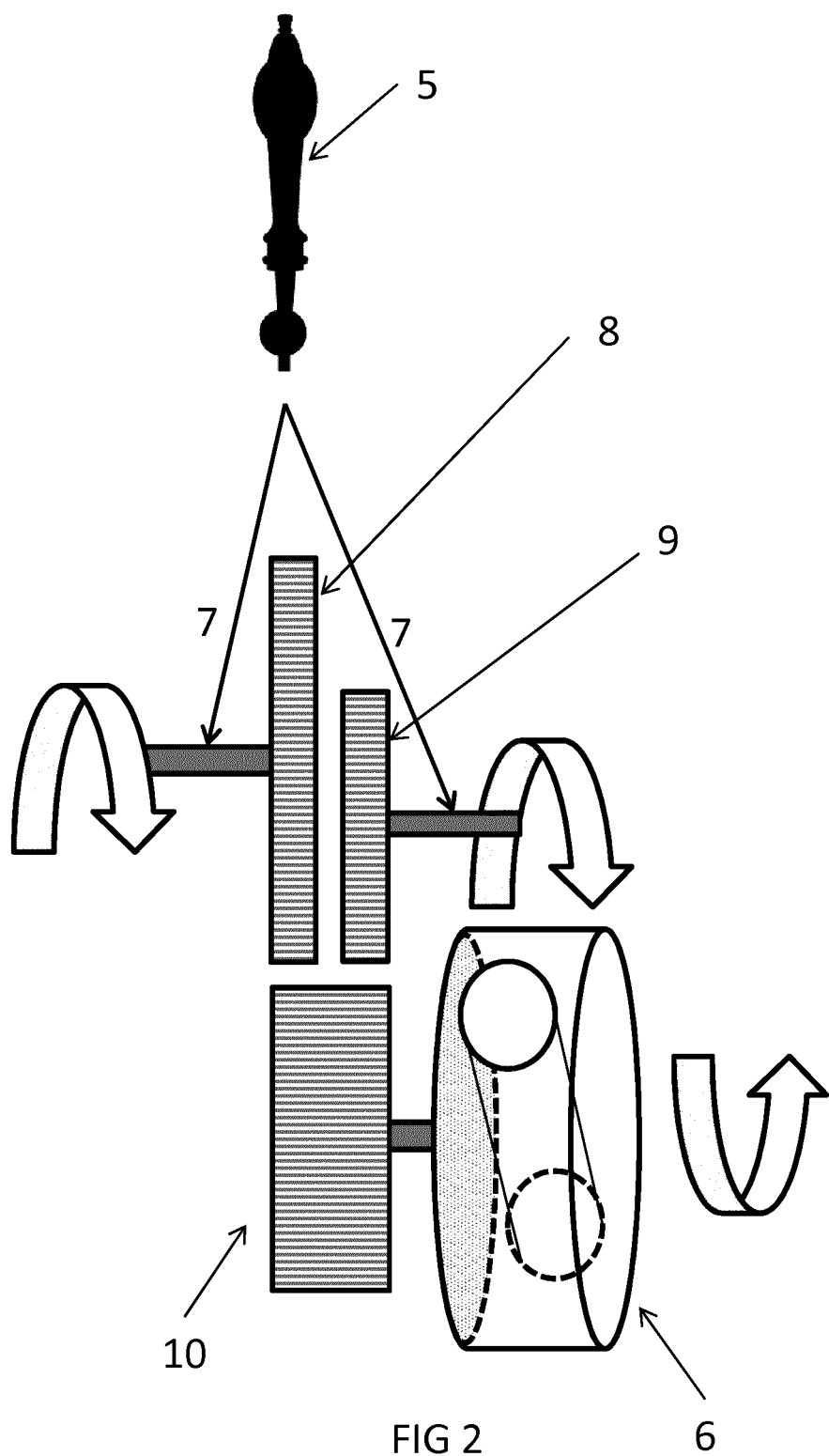
FIG. 2 illustrates another basic embodiment of a tap in accordance with the present invention.

In another embodiment in accordance with the present invention and as illustrated in FIG. 2, the gear transmission with variable gear ratio may comprise a first gear wheel (8) and a second gear wheel (9) for being coupled to the handle (5), a means (7) for coupling the handle to said first or said second gear wheel thereby varying the gear ratio, and a third gear wheel (10) which is directly or indirectly driven by the first or the second gear wheel and coupled to the valve (6). In this case one gear wheel for driving the valve is mounted and a selection is to be made between at least a first and a second gear wheel driven by the handle. As shown, optionally the dimensions of the first gear wheel (8) and the second gear wheel (9) may be adapted such that both engaging the third gear wheel (10) independently of which one is driven by the handle.

Alternatively, the gear transmission may comprise a first gear wheel and a second gear wheel for being coupled to the valve, a means for coupling the valve to said first or second gear wheel thereby varying the gear ratio, and a third gear wheel which is directly or indirectly driven by the first or the second gear wheel and coupled to the handle. In this case one gear driven by the handle is mounted and a selection is to be made between at least a first and a second gear wheel driving the valve.

Figure 3:
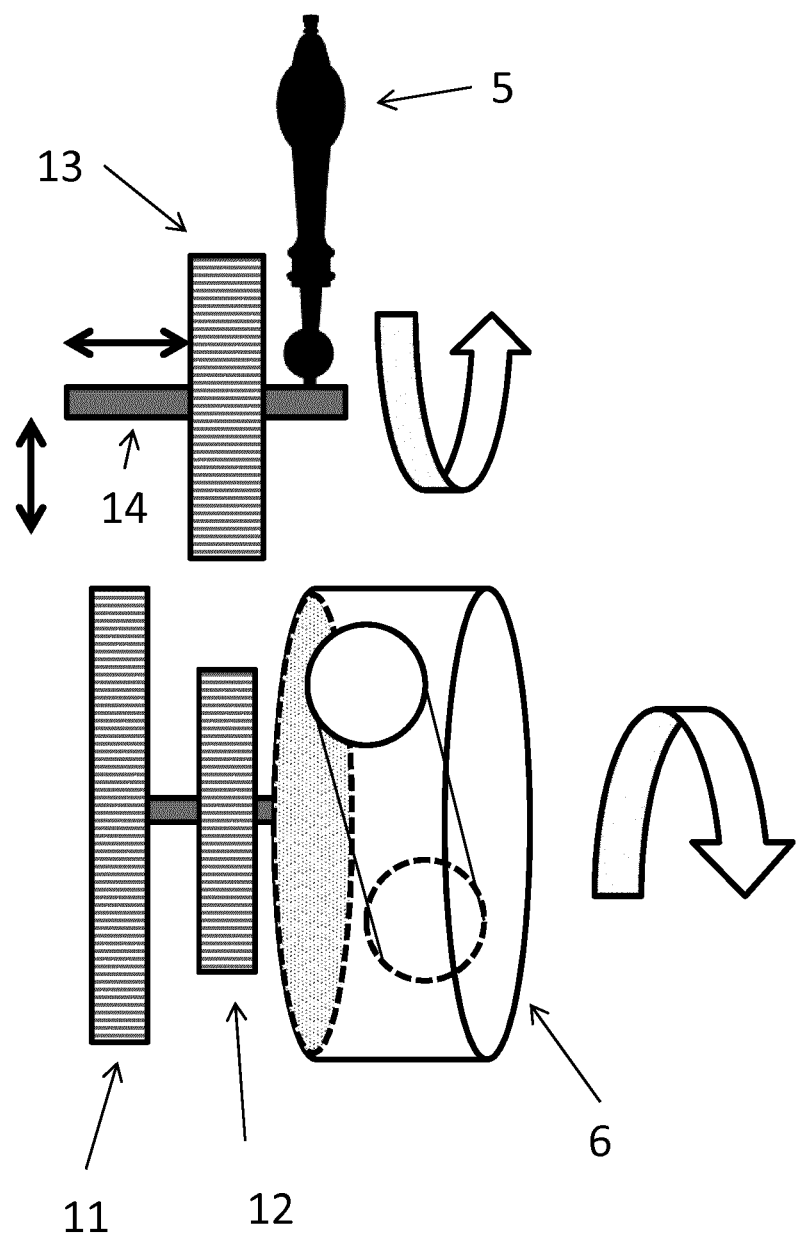
FIG. 3 illustrates another basic embodiment of a tap in accordance with the present invention.

In another embodiment in accordance with the present invention and as illustrated in FIG. 3, the gear transmission comprises a first gear wheel (11) and a second gear wheel (12) both coupled to the valve (6), a third gear wheel (14) coupled to the handle (5), and a means (14) for shifting the third gear wheel between a position directly or indirectly engaging with the first gear wheel and a position directly or indirectly engaging with the second gear wheels (see arrows). Also in this case one gear wheel driven by the handle is mounted and a selection is to be made between at least a first and a second gear wheel driving the valve.

Figure 4:
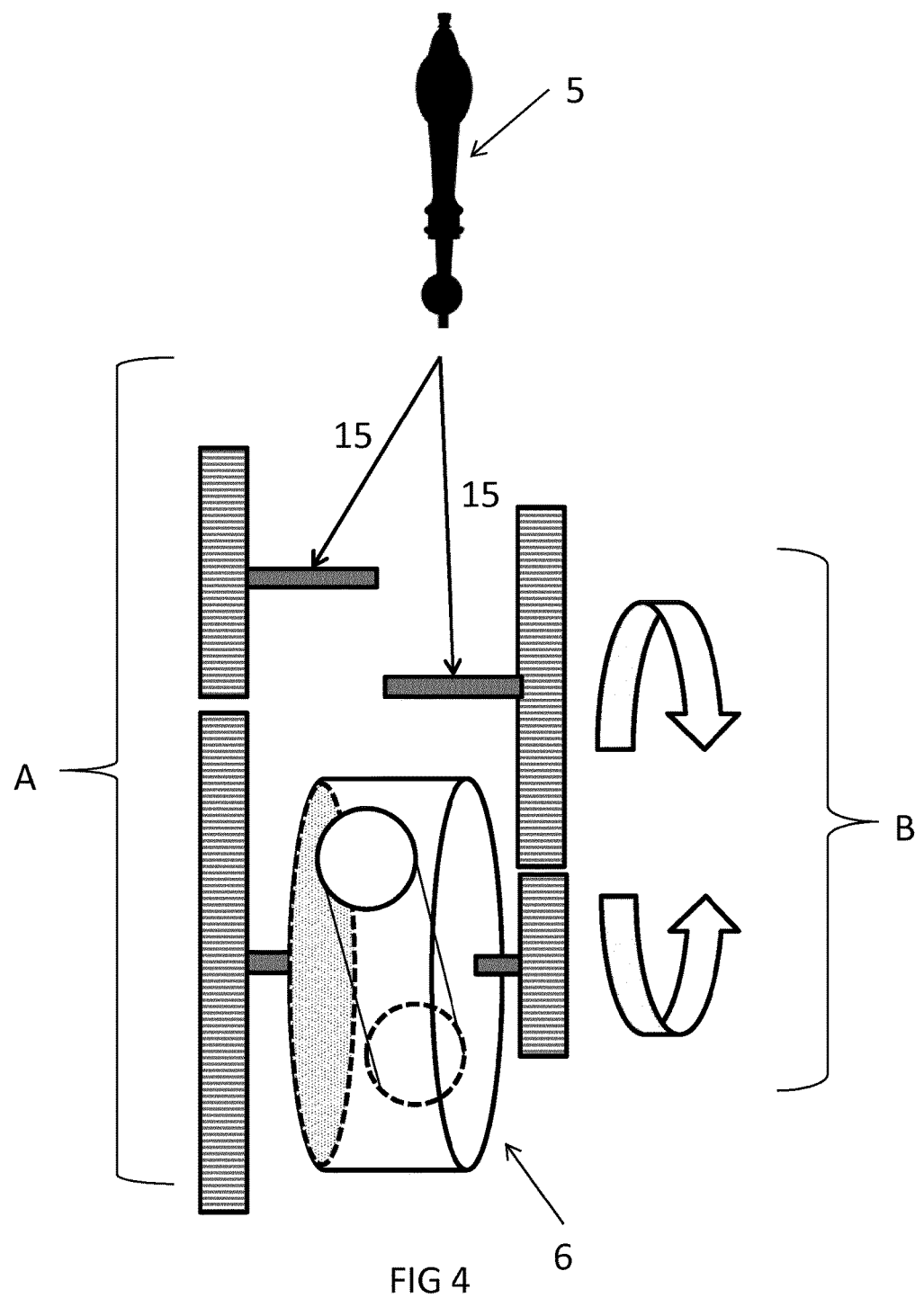
FIG. 4 illustrates an embodiment of a tap in accordance with the present invention having a gear transmission with variable gear ratio comprising two separate gear systems.

In a further embodiment according to the present invention as illustrated in FIG. 4, a tap for dispensing a beverage is provided, wherein the gear transmission comprises two gear systems (A,B) with different gear ratio and a means for coupling the handle to one or the other gear system. The two gear systems may have common parts or may be completely separately mounted within in the tap. By providing a means (15) for coupling the handle to one or the other gear system, the tap design itself does not have to be modified as a function of its intended use.

Moreover, since the modification is occurring at the gear transmission and not at the valve, the present invention enables modifying the tap as a function of its intended use without a risk for contaminating the dispensing channel.

Another advantage is that modification of a tap according to the present invention does not require in-depth technical knowledge of the tap in order to be able to modify it as a function of its intended use.

Moreover, on or more gears of one or both of the gear systems may be removably mounted, preferably at an exterior side of the tap for easy modification of the difference in gear ratio between the two gear systems.

The means for coupling the handle to one or the other gear system may be any means used in the field, such as for example means for releasing the handle from the axis driving gear system (A) and coupling it to another axis driving the other one (B). In another example (not shown) the handle may be equipped with an additional gear which may be shifted from engaging with the first gear wheel system to engaging with the second one.

In a preferred embodiment in accordance with the present invention, the gear transmission may comprise two planetary gear systems with different gear ratio, each having a sun gear, one or more planet gears (which may be hold by a planet carrier) and an annular gear, wherein the difference in gear ratio may be defined by a difference in annular gear size or a difference in sun gear size.

In an embodiment in accordance with the present invention and as illustrated in FIG. 5, a tap may be provided wherein the means (15) for coupling the handle is adapted for variably connecting the handle to one of the sun gears (16) or to one of the one or more planet gears (optionally via a planet carrier) of the planetary gear systems, and wherein the valve (6) is coupled to both annular gears (17).

Figure 6:
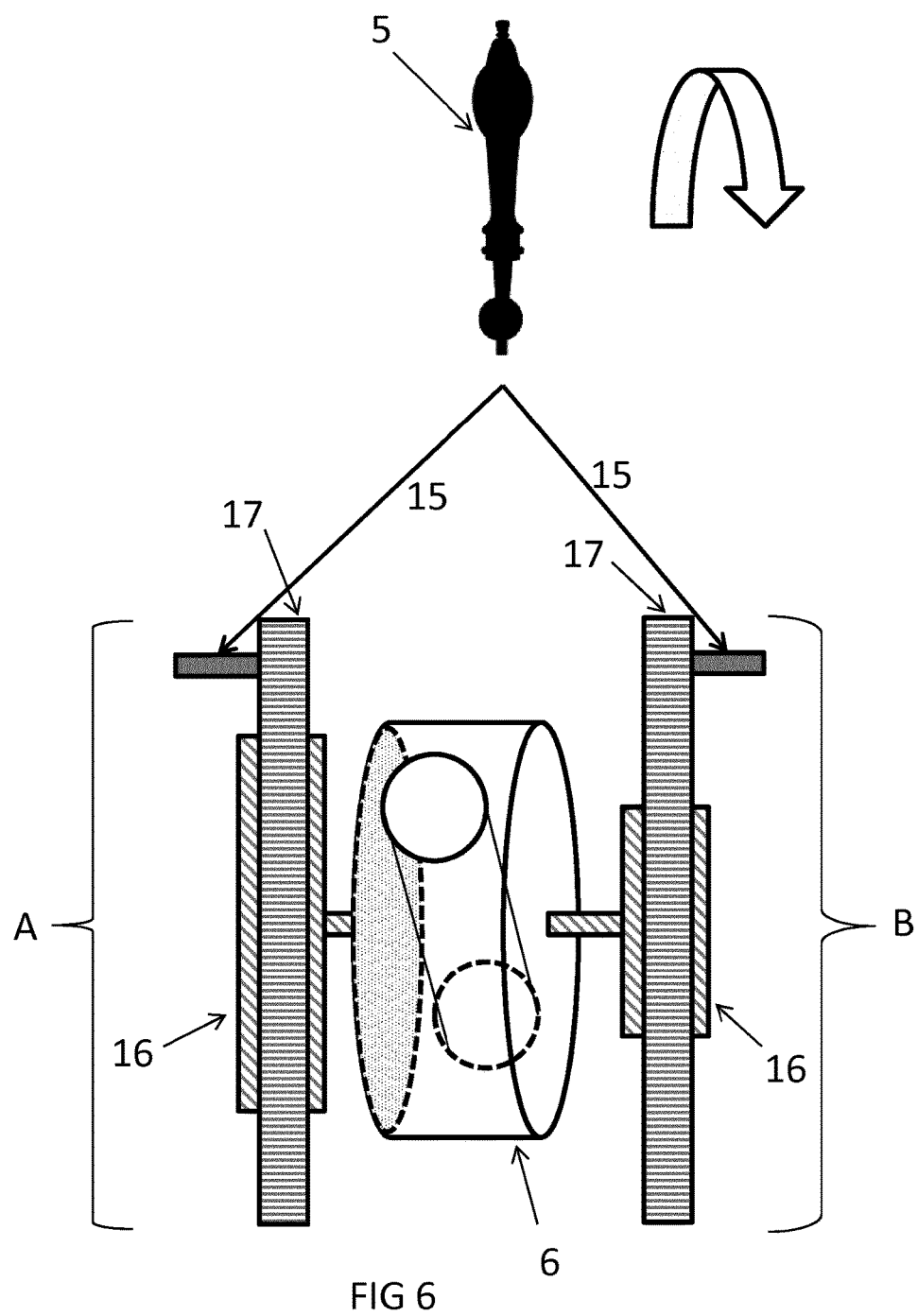
Figure 7:
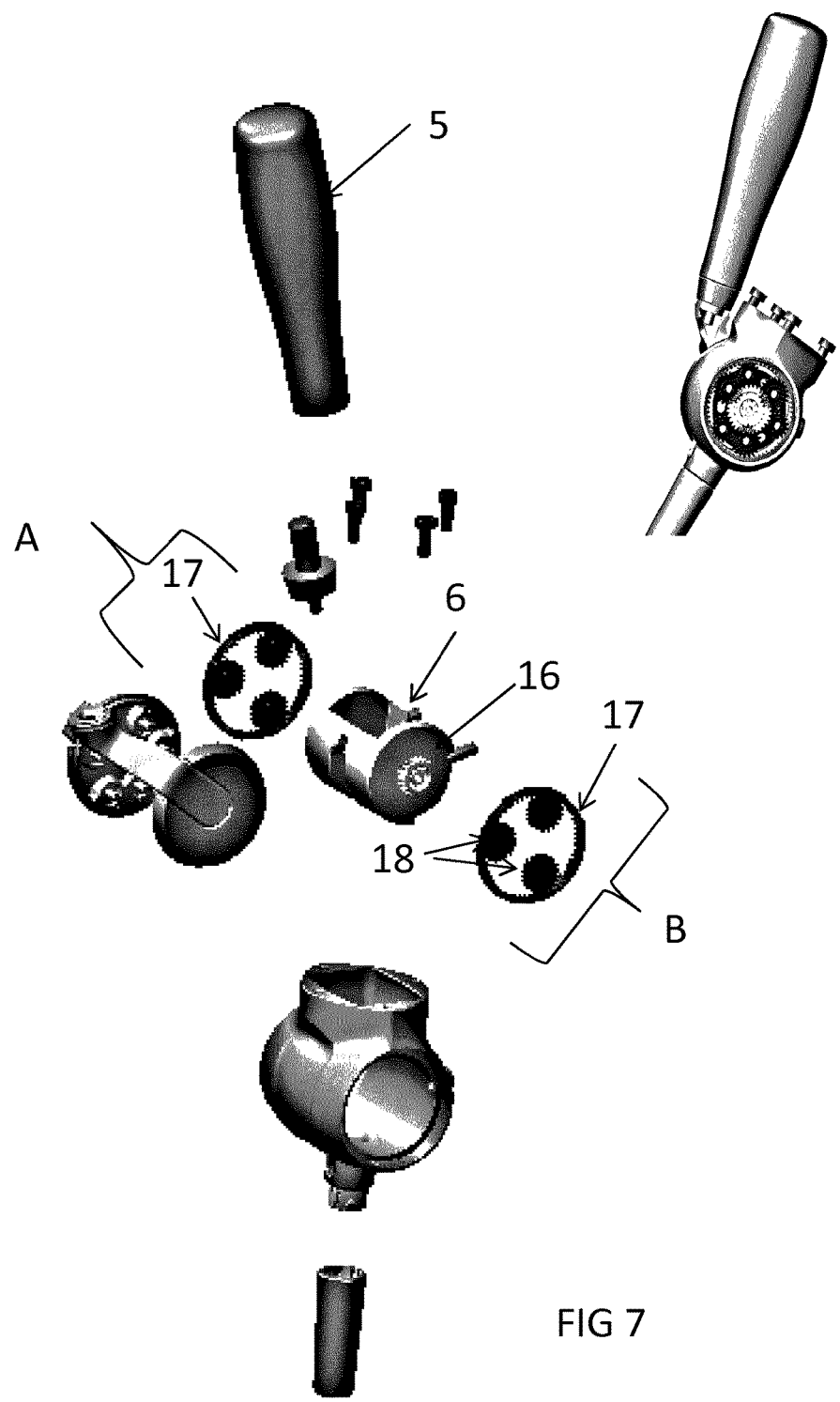

Alternatively as shown in FIGS. 6 and 7, a tap may be provided wherein the means (15) for coupling the handle is adapted for variably connecting the handle to one of the annular gears (17) or to one of the one or more planet gears (18) (optionally via a planet carrier) of the planetary gear systems, and wherein the valve is coupled to both sun gears (16).

In another alternative embodiment, the means for coupling the handle is adapted for variably connecting the handle to one of the sun gears or to one of the annular gears, and wherein the valve is coupled to the one or more planet gears (optionally via planet carriers) of both planetary gear systems.

The planetary systems may be mounted around the valve's axis of rotation, either at the same side, either preferably at opposite sides of the valve as shown in FIG. 7, which may be advantageous from design point of view because of efficient use of available space in the tap.

Using planetary systems may have an additional advantage in the sense that it may be relatively easy to change the gear ratio of one or both of the planetary gear systems by changing for example a sun gear and corresponding planet gears.

A tap according to any of the embodiments described in this text may comprise a gear transmission with a variable gear ratio between 10:90 and 90:10, or between 20:90 and 90:20, or between 30:60 and 60:30.

In the present invention, the valve may be any type of valve conventionally used in a tap for dispensing beverages, as for example ball valves, butterfly valves, disc valves, pinch valves, etc.

The invention claimed is:

1. A tap for dispensing a beverage, comprising:
   (a) a housing defining a dispensing channel for dispensing a beverage,
   (b) a valve arranged in the housing allowing opening and closing the dispensing channel, said valve operable by a handle and connected to a valve drive shaft and said handle connected or to be connected to a tap drive shaft, and
   (c) a gear transmission,
   wherein the gear transmission comprises at least two cooperating gear wheels, a first gear wheel coupled to the tap drive shaft and a second gear wheel coupled to the valve drive shaft, at least one of said gear wheels being removable from the respective tap drive shaft or valve drive shaft.

2. The tap according to claim 1, wherein the valve drive shaft extends in a longitudinal direction offset from the valve ending in an end portion and wherein the first gear wheel is coupled to said end portion of the valve drive shaft.

3. The tap according to claim 1, wherein the tap drive shaft extends in a same longitudinal direction of the valve drive shaft ending in an end portion and wherein the second gear wheel is coupled to said end portion of the tap drive shaft.

4. The tap according to claim 1, wherein the gear transmission comprises a planetary gear system having a sun gear, one or more planet gears and an annular gear, and wherein at least two of said sun gear, one or more planet gears and annular gear are respectively coupled to the valve drive shaft and the tap drive shaft and at least one mounted removably from the respective valve drive shaft or tap drive shaft.

5. The tap according to claim 1, wherein the dispensing channel enables accommodating a disposable beverage line therein to be opened and closed by the valve.

6. A kit of parts comprising:
   (a) a housing defining a dispensing channel for dispensing a beverage,
   (b) a valve arranged in the housing allowing opening and closing the dispensing channel, said valve operable by a handle and connected to a valve drive shaft and said handle connected or to be connected to a tap drive shaft, and
   (c) a gear transmission comprising at least two cooperating gear wheels, a first gear wheel to be removably coupled to the tap drive shaft and a second gear wheel to be removably coupled to the valve drive shaft.

7. The kit of parts according to claim 6, wherein the tap drive shaft extends in a longitudinal direction offset from the valve ending in an end portion and wherein the first gear wheel is coupled to said end portion of the valve drive shaft, and wherein the tap drive shaft extends in the longitudinal direction of the valve drive shaft ending in an end portion and wherein the second gear wheel is coupled to said end portion of the tap drive shaft.

8. A method for manufacturing a tap for dispensing a beverage allowing control between a tap handle rotation and a valve actuation rate, said tap comprising: (a) a housing defining a dispensing channel for dispensing a beverage, (b) a valve arranged in the housing allowing opening and closing a dispensing channel, said valve operable by a handle and connected to a valve drive shaft and said handle connected to a tap drive shaft, and (c) a gear transmission comprising at least two cooperating gear wheels, a first gear wheel to be removably coupled to the tap drive shaft and a second gear wheel to be removably coupled to the valve drive shaft; the method comprising the steps of
   assembling the housing, with the valve coupled to the valve drive shaft arranged therein;
   mounting the tap handle on the tap drive shaft;
   selecting a set of gears in view of a desired gear ratio between the valve drive shaft and the tap drive shaft; and subsequent to assembling the valve and the handle, removably mounting the gears on the respective tap drive shaft or valve drive shaft, such that the gear wheels interact.

9. A tap for dispensing a beverage comprising, a housing defining a dispensing channel for dispensing a beverage, a valve arranged in the housing allowing opening and closing a dispensing channel, said valve operable by a handle and a gear transmission between the valve and the handle, characterized in that the gear transmission has a variable gear ratio defining the ratio between the rotation angle of the handle and the rotation angle of the valve, whereby replacing a first gear driven by the handle or a second gear driving the valve with a gear of a different diameter modifies the gear ratio of the gear transmission and the valve actuation rate upon rotating the handle.

10. The tap according to claim 9, wherein the gear transmission comprises two gear systems with different gear ratio, the handle configured to couple to either of the two gear systems.

11. The tap according to claim 10, the gear transmission comprising two planetary gear systems with different gear ratio.

12. The tap according to claim 11, wherein the planetary systems are mounted offset around a valve's axis of rotation at opposite sides of the valve.

\* \* \* \* \*